US007814074B2

(12) United States Patent
Anglin et al.

(10) Patent No.: US 7,814,074 B2
(45) Date of Patent: Oct. 12, 2010

(54) METHOD AND SYSTEM FOR ASSURING INTEGRITY OF DEDUPLICATED DATA

(75) Inventors: Matthew J. Anglin, Tucson, AZ (US); David M. Cannon, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 12/048,850

(22) Filed: Mar. 14, 2008

(65) Prior Publication Data

US 2009/0234892 A1  Sep. 17, 2009

(51) Int. Cl.
*G06F 17/30* (2006.01)

(52) U.S. Cl. .................. 707/692; 707/640; 707/664; 707/673; 707/690; 707/698; 707/699

(58) Field of Classification Search .................. None
See application file for complete search history.

(56) References Cited

U.S. PATENT DOCUMENTS

| 5,990,810 | A  | * | 11/1999 | Williams | ............... 341/51 |
| 6,889,297 | B2 |   | 5/2005  | Krapp et al. | |
| 7,092,956 | B2 |   | 8/2006  | Ruediger | |
| 7,200,604 | B2 |   | 4/2007  | Forman et al. | |
| 7,519,635 | B1 | * | 4/2009  | Haustein et al. | ............. 1/1 |
| 2002/0169934 | A1 | * | 11/2002 | Krapp et al. | ............ 711/159 |
| 2004/0148306 | A1 | * | 7/2004 | Moulton et al. | ............ 707/101 |
| 2005/0091234 | A1 | * | 4/2005 | Hsu et al. | ............... 707/100 |
| 2005/0262194 | A1 |   | 11/2005 | Mamou et al. | |
| 2006/0041562 | A1 |   | 2/2006 | Paczkowski et al. | |
| 2006/0053182 | A1 |   | 3/2006 | Sen et al. | |
| 2007/0043734 | A1 | * | 2/2007 | Cannon et al. | ............... 707/10 |
| 2007/0208788 | A1 |   | 9/2007 | Chakravarty et al. | |
| 2008/0294696 | A1 | * | 11/2008 | Frandzel | ............... 707/200 |

OTHER PUBLICATIONS

Larry Freeman, "Looking Beyond the Hype: Evaluating Data Deduplication Solutions", Netapp White Paper, 2007, p. 1-11.*
"Deduplication Storage for Nearline Applications", Datadomain White Paper, 2007, p. 1-12.*
Data De-duplication Methodologies: Comparing ExaGrid's Byte-level Data De-duplication to Block Level Data De-duplication, Feb. 2007, 6 pages.

* cited by examiner

*Primary Examiner*—Apu M Mofiz
*Assistant Examiner*—Hung D Le
(74) *Attorney, Agent, or Firm*—Oppenheimer Wolff & Donnelly, LLP

(57) ABSTRACT

The present invention provides for a system and method for assuring integrity of deduplicated data objects stored within a storage system. A data object is copied to secondary storage media, and a digital signature such as a checksum is generated of the data object. Then, deduplication is performed upon the data object and the data object is split into chunks. The chunks are combined when the data object is subsequently accessed, and a signature is generated for the reassembled data object. The reassembled data object is provided if the newly generated signature is identical to the originally generated signature, and otherwise a backup copy of the data object is provided from secondary storage media.

23 Claims, 9 Drawing Sheets

METHOD AND SYSTEM FOR ASSURING INTEGRITY OF DEDUPLICATED DATA

FIELD OF THE INVENTION

The present invention generally relates to data storage and retrieval operations within a data storage system. The present invention specifically relates to the operation of a method and a system of assuring integrity of deduplicated data on a storage-management system which provides a repository for computer information that is backed up, archived, or migrated from client nodes in a computer network.

BACKGROUND OF THE INVENTION

Data storage solutions can be enhanced by introducing a form of compression known as "deduplication". Deduplication generally refers to the elimination of redundant subfiles from data objects, these subfiles generally referred to as blocks, chunks, or extents. The deduplication process is usually applied to a large collection of files in a shared data store, and its successful operation greatly reduces the redundant storage of common data.

In a typical configuration, a disk-based storage system such as a storage-management server or virtual tape library has the capability to perform deduplication by detecting redundant data chunks within its data objects and preventing the redundant storage of such chunks. For example, the deduplicating storage system could divide file A into chunks a-h, detect that chunks b and e are redundant, and store the redundant chunks only once. The redundancy could occur within file A or with other files stored in the storage system. Deduplication can be performed as objects are ingested by the storage manager (in-band) or after ingestion (out-of-band).

Known techniques exist for deduplicating data objects. Typically, the object is divided into chunks using a method such as Rabin fingerprinting. Redundant chunks are detected using a hash function such as MD5 or SHA-1 to produce a hash value for each chunk, and this hash value is compared against values for chunks already stored on the system. The hash values for stored chunks are typically maintained in an index. If a redundant chunk is identified, that chunk can be replaced with a pointer to the matching chunk.

Advantages of data deduplication include requiring reduced storage capacity for a given amount of data; providing the ability to store significantly more data on a given amount of disk; and improving the ability to meet recovery time objective (RTO) when restoring from disk rather than tape.

Although deduplication offers these potential benefits, it also introduces new risks of data loss for any of several reasons. The first risk is false matches. It is possible that two different chunks could hash to the same value (called a collision), causing the system to deduplicate an object by referencing a chunk that does not match. Depending on the hash function used, the probability of such a collision may be extremely low but is still finite. Avoidance techniques include combining multiple hashes against the same chunk, comparing other information about chunks, or performing a byte-by-byte comparison. However, these techniques may involve additional, time-consuming processing for assessing every chunk or byte.

Additionally, deduplication increases the potential impact of media failure. If one chunk is referenced by multiple data objects, loss of that one chunk due to media error or failure could result in data loss for many objects. Similarly, a higher risk for logic errors also exists because deduplication adds significant complexity to a storage system, thus creating the potential for data loss due to a programming error.

A solution is needed to achieve the benefits of deduplication while also providing protection against data loss from mechanisms such as those described above.

BRIEF SUMMARY OF THE INVENTION

The present invention provides a new and unique method and system for assuring integrity of deduplicated data within storage management applications.

In one embodiment of the present invention, before data objects are deduplicated, they are copied in their entirety to a "copy pool" on secondary storage media, which may be a low-cost archival medium such as tape. This copying is performed either during or after ingestion of the data objects but before the objects are deduplicated. Because a copy of the data object is made before the object is deduplicated, a backup copy of the data is available to protect from data loss which may occur as a result of deduplication, such as false matches, media failure, and logic errors.

Prior to or during deduplication of data objects, a signature of the entire object is generated and stored for each object. In one embodiment of the present invention, this signature is a checksum generated as the result of a hash function. Because the checksum is generated before the object is deduplicated, each checksum represents a digital signature of the entire object. This signature of the entire object is then stored in an index or database for later access.

Deduplication is then performed upon the data object. In one embodiment of the invention, deduplication is performed by dividing the data object into a set of data chunks and determining if any data chunks within this set already exist on the primary storage media. In one embodiment of the present invention, the process of dividing a data object into data chunks occurs using a Rabin fingerprinting technique.

If an identical data chunk already exists for one of the data chunks on the primary storage media, then a pointer to this previously existing data chunk is created. If an identical data chunk does not exist on the primary storage media, then the data chunk is stored on the primary storage media.

Whenever an object is accessed, such as during a restore or a storage audit operation, the chunks produced from the deduplicated data object are re-combined into a single data object. If the deduplication process was successful, this reassembled data object will be identical to the original pre-deduplication data object. To verify whether the data object is in fact identical, a new signature is computed against the reassembled post-deduplication object.

The new signature from the reassembled deduplicated object is then compared with the signature generated and stored for the pre-deduplication object. If these signatures match, the deduplicated object is considered to be valid, meaning that the original data object was correctly reassembled from a deduplicated state. Thus, the reassembled file can be provided to the user. Depending upon the size of the object, it may not be known that an object is invalid until some or most of the data has already been sent to the user. Before the final piece of data is provided to the user, however, the determination is made as to whether the entire object is valid. If it is not valid, the data transfer to the user is interrupted to signal an error.

If the signatures do not match, there is something wrong with the deduplicated data object, for example as a result of a false match, media failure or error, or deduplication logic error. The deduplication system will treat the deduplicated object as damaged, and automatically access the corresponding backup of the data object that was copied prior to deduplication. There may be a delay to recover the data from the backup location, but the error would be detected and data loss averted. In one embodiment of the invention, a valid form of the invalid object could also be recovered to the deduplicated disk media from the copy.

By performing an integrity check upon the reassembled form of the deduplicated data, the present invention allows the space-saving benefits of deduplication to be achieved while also ensuring that data can later be accessed without data loss. Because a backup copy is made before deduplication, that backup copy is valid irrespective of any errors that might be introduced by deduplication processing. Thus, by computing and storing a digital signature for the entire data object before deduplication, the present invention provides a means to detect errors introduced during or after deduplication.

In one embodiment of the present invention, the original object signature and reassembled object signature are checksums generated from a hash function such as cyclic redundancy check, MD5, SHA-1, SHA-256, SHA-512, or Whirlpool. In one embodiment of the present invention, these hash functions may also be used during the deduplication process to determine whether a data chunk with a particular hash value is already stored in the system.

DETAILED DESCRIPTION OF THE INVENTION

The presently disclosed method and system of assuring integrity of deduplicated data provides a general mechanism for protecting against data corruption occurring as a result of a deduplication process. One embodiment of the present invention achieves this result by not only computing a digital signature of data object chunks to perform the deduplication process, but also by computing a digital signature of the entire data object as a whole before the data is deduplicated. This computed digital signature of the entire data object is subsequently used to verify the reassembly of the data object into its original state when the file is later accessed.

The presently disclosed method and system therefore provides a means to detect errors introduced during or after deduplication. By performing an integrity check upon data retrieved from a deduplicated state, the present invention provides assurance that the data objects retrieved from a deduplicated state are in their undamaged, original condition. This method and system greatly reduce the possibility of false matches occurring in the hash function used on the numerous data chunks of the data file, and thus improve the integrity of the deduplicated data as a whole.

Figure 1A:
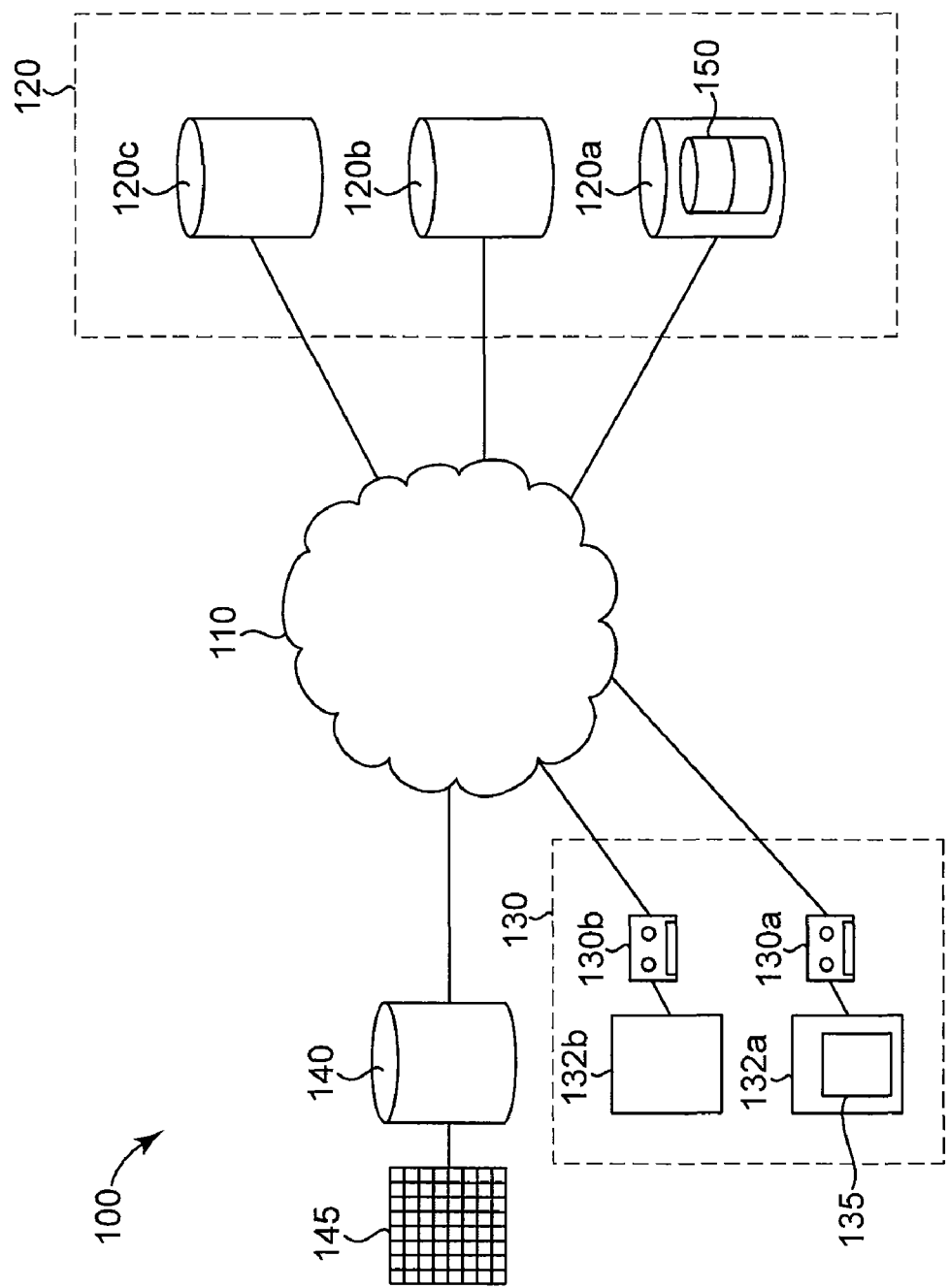
FIG. 1A illustrates an exemplary operational environment for the operation of one embodiment of the present invention.

FIG. 1A depicts a block diagram of an exemplary operational environment for one embodiment of the present invention, demonstrating a storage management system 100 operating over a network 110. The storage management system 100 includes a "primary storage pool" 120 where data is stored during its normal operation within the storage management system, the primary storage pool 120 including multiple storage disks 120a, 120b, and 120c connected over the network 110. The primary storage disk 120a contains a volume 150 which stores a plurality of data objects.

The storage management system 100 further includes a "copy pool" 130 to contain backups of data objects that are stored in the primary pool. The copy pool 130, which is implemented in this embodiment in the form of tape backup systems 130a and 130b, may also be implemented in any other suitable backup means. The tape backup system 130a further contains a tape media 132a with a data volume 135, the data volume 135 storing backup copies of a plurality of data objects.

The storage management system 100 further includes a database 140 that contains an index 145 which tracks the location of data objects stored throughout the storage management system. This index 145 tracks data stored in volumes throughout the primary storage pool 120 and the backup copy pool 130.

Figure 1B:
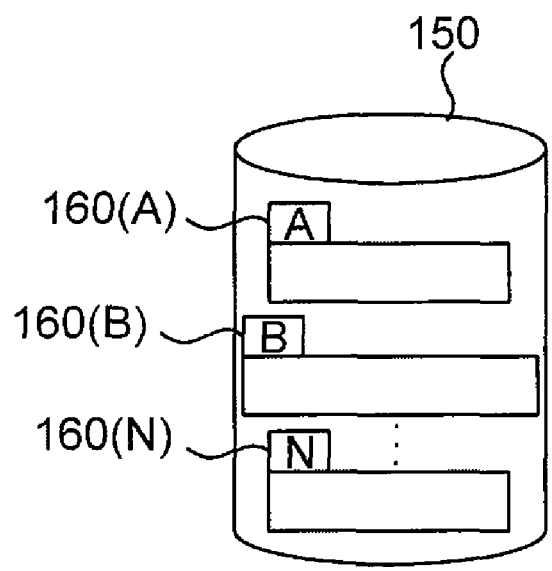
FIG. 1B illustrates an exemplary state of a storage volume utilized in one embodiment of the present invention.

FIG. 1B depicts an exemplary condition of the data volume 150 which corresponds to the data volume stored within the primary storage disk 120a of FIG. 1A. The storage volume 150 contains data objects 160(A)-160(N).

In one embodiment of the present invention, before the data objects 160(A)-(N) on data volume 150 are deduplicated (i.e., before the redundant data chunks are eliminated), the data objects 160(A)-(N) are copied in their entirety from volume 150 to create a backup within the copy pool 130. This backup is depicted in FIG. 1A as occurring on archival backup system 130a within the copy pool 130. An archival backup system may be implemented in the form of a tape or an inexpensive disk, or other suitable backup storage means.

Figure 1C:
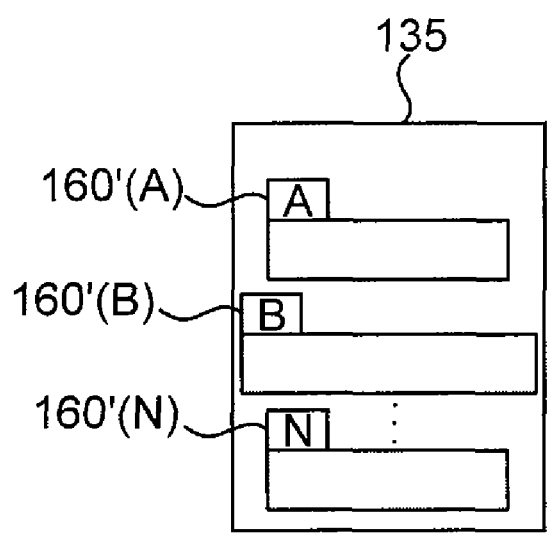
FIG. 1C illustrates an exemplary state of a backup volume utilized in one embodiment of the present invention.

FIG. 1C depicts an exemplary condition of the backup data volume 135 which corresponds to the data volume stored within the backup tape media 132a on the tape backup system 130a of FIG. 1A. The backup volume 135 contains copies of the data objects stored on the data volume 150, as depicted by data objects 160'(A)-160'(N). However, a correspondence between the primary storage pool volume 150 and copy pool volume 135 is not necessary. For example, a copy pool volume may contain copies of data objects from multiple primary storage pool volumes, or even multiple primary storage pools. Similarly, the data objects for a given primary storage pool volume may be copied to multiple copy pool volumes, or even to multiple copy storage pools.

Figure 2A:
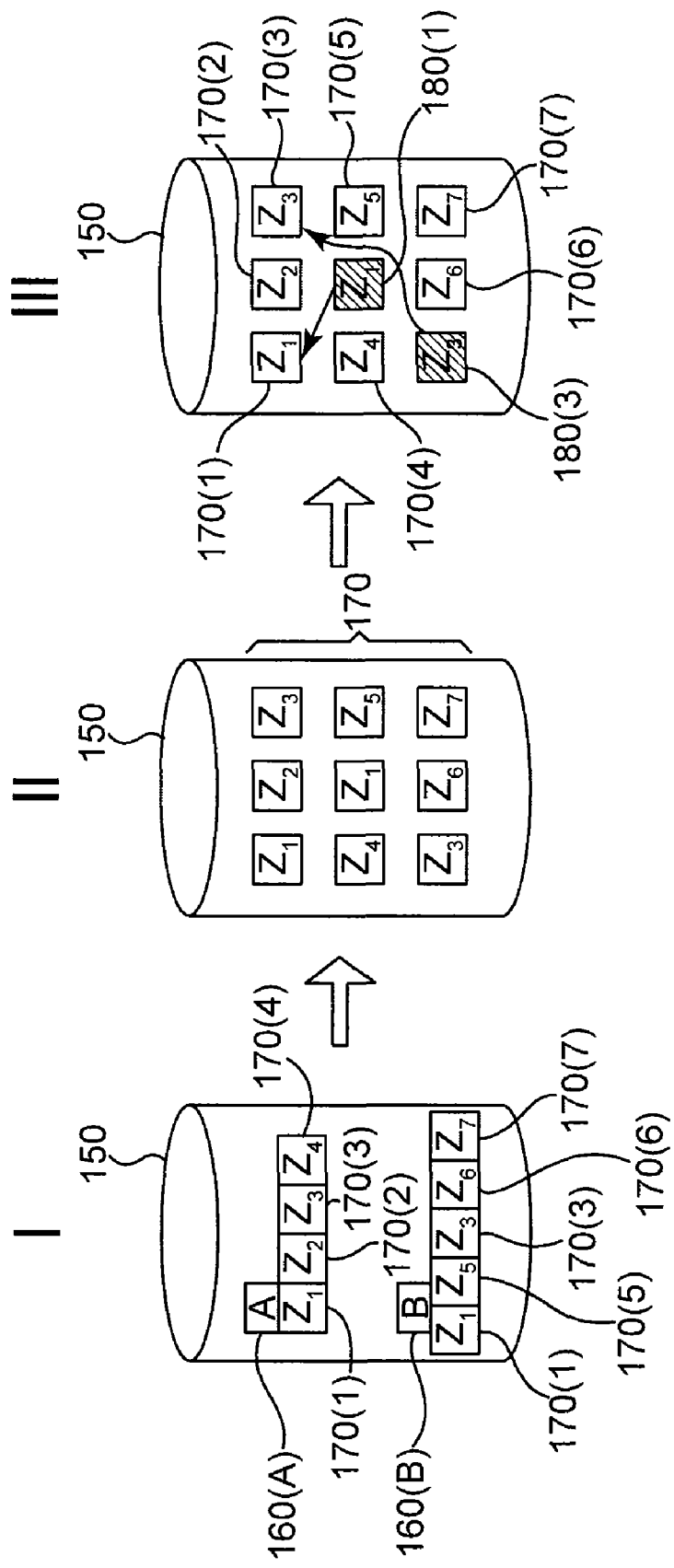
FIG. 2A illustrates an exemplary out-of-band deduplication process being performed in accordance with one embodiment of the present invention.

FIG. 2A demonstrates an out-of-band data deduplication process operating in one embodiment of the present invention. As depicted in Stage I, data has been ingested into the system before performing deduplication, i.e., data objects are stored in the storage management system in an original, unmodified state before deduplicating. This is depicted by volume 150 in Stage I which contains data objects 160(A) and 160(B) that have not yet been deduplicated.

The deduplication process as depicted in Stage I of FIG. 2A operates by splitting each data object 160(A)-(B) stored on volume 150 into sets of various chunks 170. As further shown in Stage I, data object 160(A) is divided into chunks 170(1), 170(2), 170(3), and 170(4), and data object 160(B) is divided into chunks 170(1), 170(5), 170(3), 170(6), and 170(7). As shown, it is possible for multiple data objects to contain identical chunks, as chunks 170(1) and 170(3) are present in both data objects 160(A) and 160(B).

The result of splitting the data objects is depicted in Stage II of FIG. 2A, with the set of data chunks 170 now residing on the data volume 150. Alternatively, the deduplication process may involve storing and/or deduplicating the data chunks 170 onto another volume in the storage management system.

After the deduplication process is complete, each of the data objects 160(A)-(N) which existed on the primary storage volume 150 will be transformed into a series of chunks and pointers. As depicted in Stage III of FIG. 2A, the deduplication process has operated to replace data chunks that are duplicate of 170(1) and 170(3) with pointers 180(1) and 180(3). Once the data is fully deduplicated, the primary storage media volume 150 contains only one copy of each data chunk within data chunks 170. The index 145 depicted within FIG. 1 of the exemplary storage management system is utilized to list and track the various data chunks 170 and pointers 180, allowing the system to efficiently locate duplicate chunks and deallocate space to eliminate the redundant chunks. Although this example suggests that that common chunks are shared only within a single volume, it is possible for common chunks to be shared within an entire storage pool or even across multiple storage pools.

The deduplication process depicted in FIG. 2A is performed subsequent to data ingestion, and is preceded by an operation to copy data to the copy pool volume 135 such as an asynchronous storage pool backup operation. However, as depicted in FIG. 2B, in an alternative embodiment of the present invention, the backup and deduplication processes may also be performed synchronously during ingestion of new data objects into the storage management system.

Figure 2B:
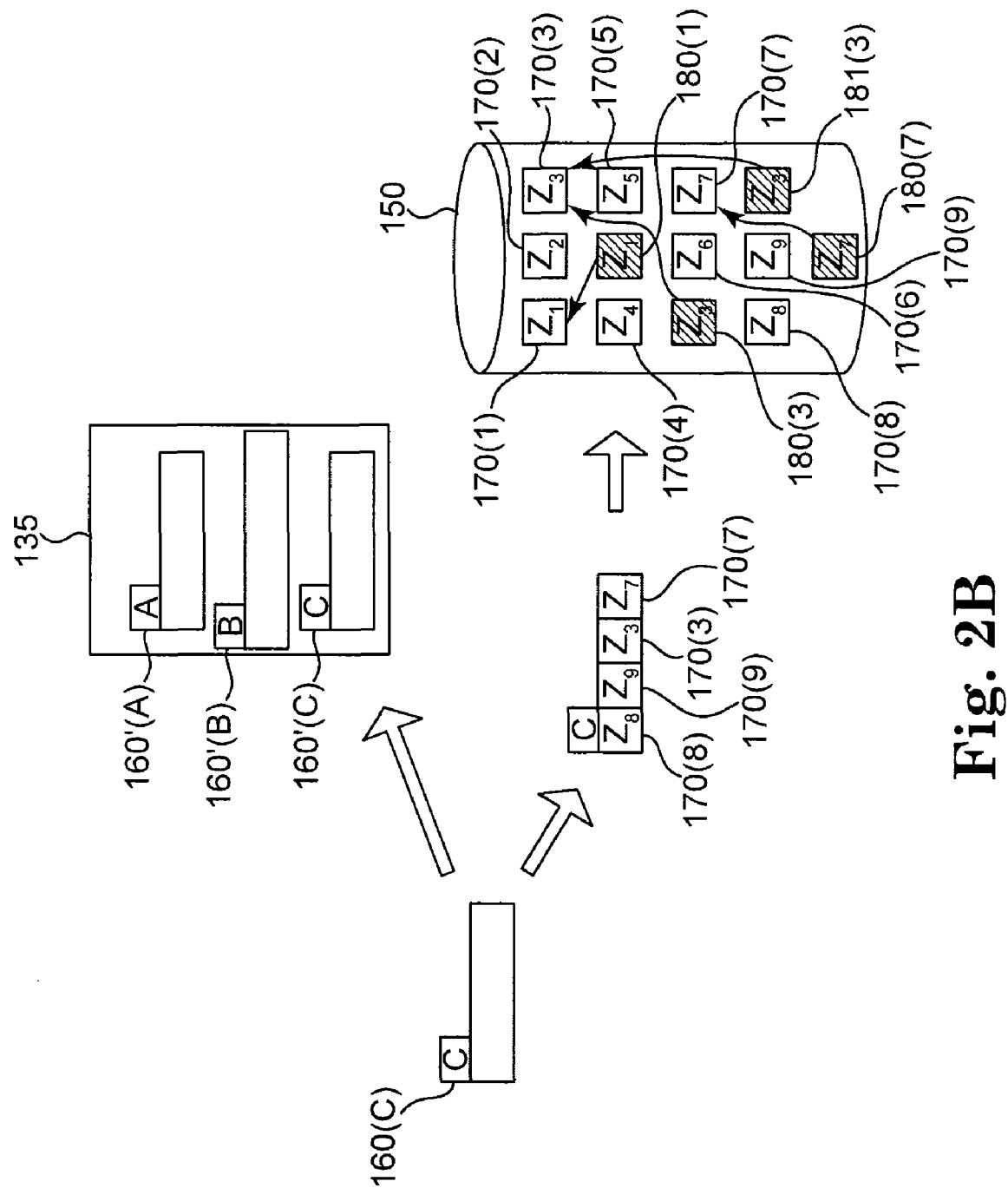
FIG. 2B illustrates an exemplary in-band deduplication process being performed in accordance with one embodiment of the present invention.

FIG. 2B depicts a new data object 160(C) being introduced into the storage management system, with in-band deduplication causing the data object 160(C) to be deduplicated and stored onto data volume 150 during ingestion. As the data object is ingested, two operations occur. The data object 160(C) is first copied to the backup copy volume 135 and stored in its entire object form, creating the copy of the data object 160'(C) in addition to backup files 160'(A) and 160'(B). The second operation involves splitting the data object 160(C) into data chunks and pointers to store in a deduplicated state on volume 150.

The second operation in FIG. 2B depicts the deduplication process operating by splitting data object 160(C) into data chunks 170(8), 170(9), 170(3), and 170(7). Accordingly, because data chunks 170(3) and 170(7) are already stored on the data volume, the new copies of these data chunks are substituted with pointers 181(3) and 180(7). Pointer 180(3) previously created in the deduplication process of FIG. 2A and new pointer 181(3) now both point to the same data chunk 170(3).

Before the deduplication operations depicted in both FIGS. 2A and 2B are performed, data objects 160(A)-(N) are copied to a copy pool. Because copies are made of the non-deduplicated data objects before starting the deduplication process, protection is achieved against data loss or errors which could otherwise be caused by the deduplication process or to the deduplicated data.

Figure 3:
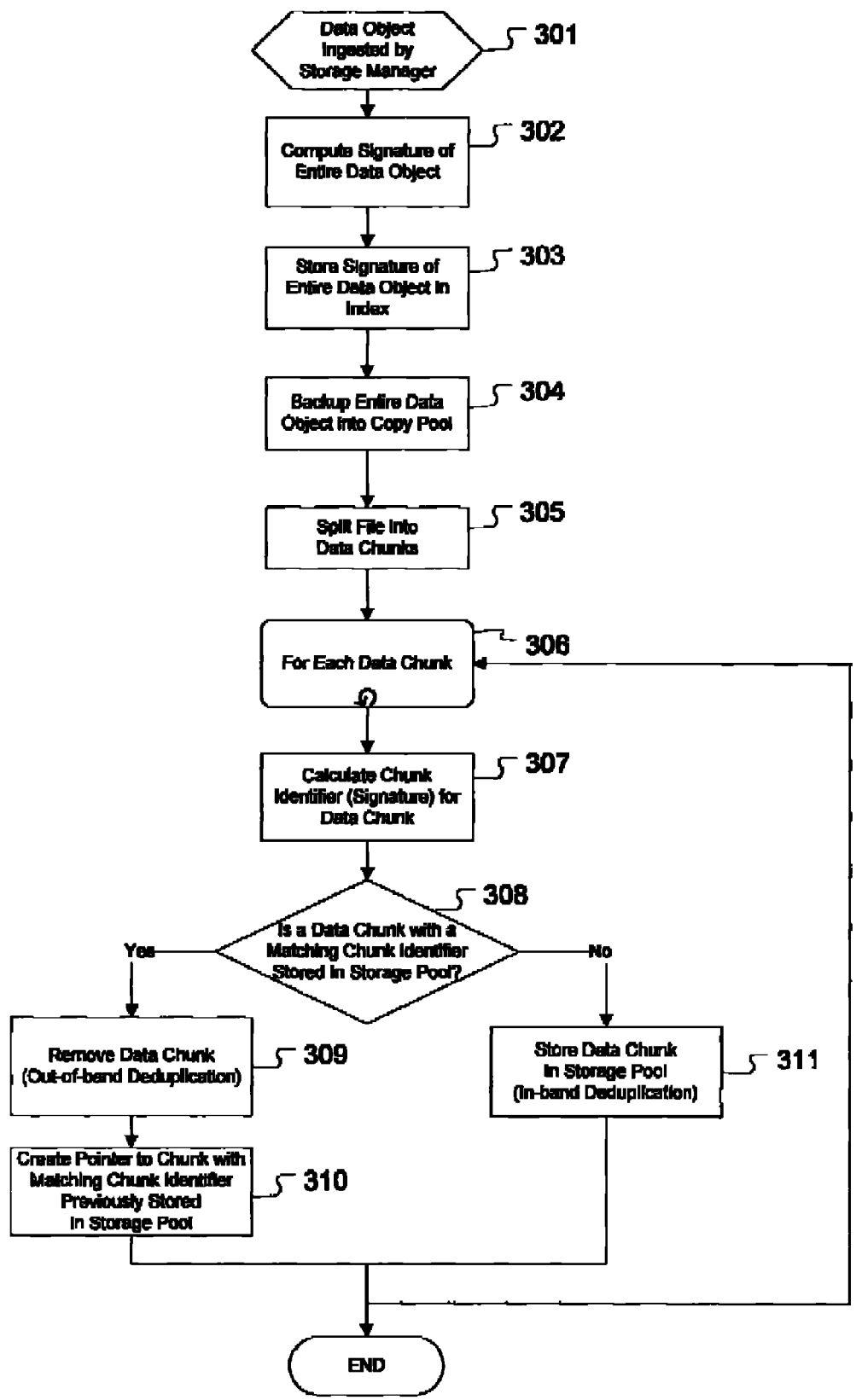
FIG. 3 illustrates a flowchart representative of an exemplary operation of the deduplication process performed in accordance with one embodiment of the present invention.

FIG. 3 depicts a flowchart further demonstrating an exemplary operation of the backup and deduplication operations upon a single data object in one embodiment of the present invention. The data object is ingested into the storage management system, step 301. For a system operating an out-of-band deduplication process, the data object is stored as part of data ingestion 301. Prior to or during deduplication of the data object, a digital signature, such as a checksum, is generated for the entirety of the data object, step 302.

The digital signature generation operation 302 may be performed in-band during data ingestion or out-of-band during an operation subsequent to data ingestion. The object signature may be generated as a checksum through a cyclic redundancy check (CRC), MD5, SHA-1, SHA-256, SHA-512, Whirlpool, or other hash function. Because the signature is generated as in step 302 before the object is divided into chunks, the checksum represents a digital signature of the entire object.

At step 303, the computed object digital signature is then stored in a storage management system database or other index. Before deduplication is performed on the data object, the entire data object is backed up to a backup storage pool, further referred to as the "copy pool", as in step 304. Although depicted as occurring after the signature is computed and stored in steps 302 and 303, in an alternative embodiment, the operation of backing up the entire data object in step 304 may be performed before computing and storing the signature.

Figure 4:
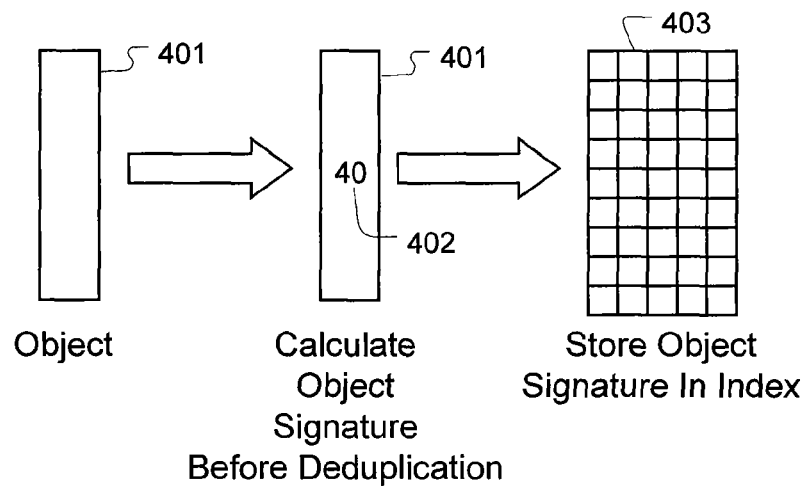
FIG. 4 illustrates a block diagram of an exemplary operation of computing the digital signature of and storing an entire data object for a exemplary data object in accordance with one embodiment of the present invention.

The operation of computing the signature for the entirety of a data object is further depicted in FIG. 4. The data object 401 is inputted into an algorithm, such as a checksum generation algorithm, which accordingly calculates the object signature 402 before deduplication. The signature 402 is then saved in an index 403, for later comparison to a signature computed when the data object is reassembled from a deduplicated state.

The deduplication process is then performed by identifying and eliminating redundant chunks within the data object. Returning to FIG. 3, in step 305, the data object is scanned and split into data chunks using a known technique such as Rabin fingerprinting. Next, at step 306-307, a unique identifier is generated for each individual data chunk. In one embodiment of the invention, these unique identifiers may be generated from a hash function and are simple hash values from hashing the data chunk. Thus, in addition to a signature being generated for the data object as a whole at step 302, a chunk-level identifier is also generated for each individual chunk of the data object at step 307. In one embodiment of the present invention, the signature generated for the entire object is generated at the same time as the data object is scanned to create chunks. In another embodiment of the present invention, the function used to generate the signature of the entire object is a hash function identical to that used to compute the identifier for each data chunk.

Figure 5:
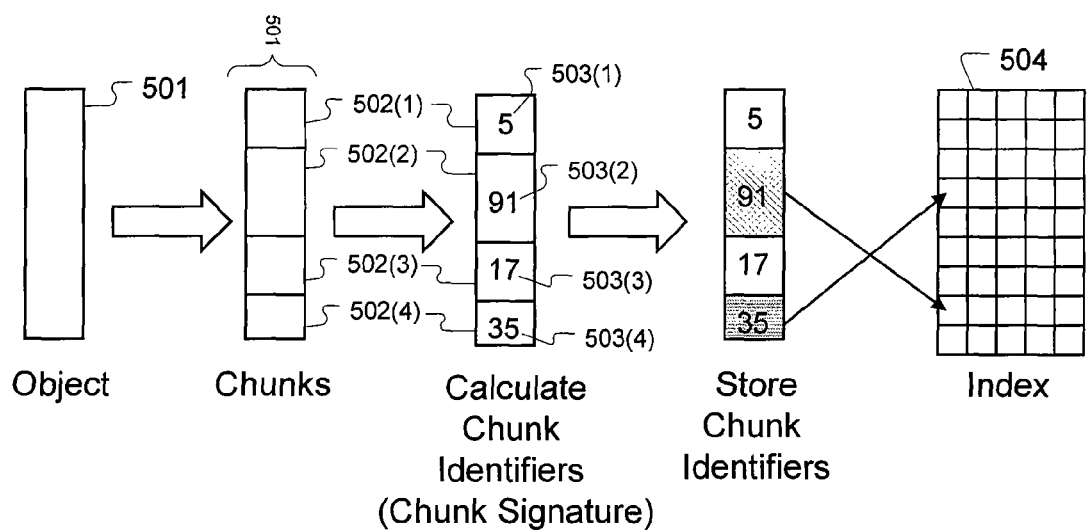
FIG. 5 illustrates a block diagram of an exemplary operation of computing the digital signature of multiple data chunks within a exemplary data object in accordance with one embodiment of the present invention.

The operation of calculating an identifier for each data chunk in accordance with one embodiment of the present invention is further depicted in FIG. 5. The data object 501 is split into a number of data chunks 502(1)-502(4). Next, a hash function is run against each data chunk, producing hash value "chunk identifiers" 503(1)-503(4). Finally, each of these chunk identifiers is stored in a database or similar index 504, thereby tracking each of the chunk identifiers and their relationships to the data objects on the system.

The strength of the signature generated in FIG. 3 for both the entire object in step 302 and of the identifier generated for each data chunk in step 306-307 may be chosen to balance processing time versus the probability of false positive matches. A very strong checksum might not be necessary for the entire object as the probability of a false match for both individual chunks and for the entire object would be negligibly small. In one embodiment of the present invention, the steps of computing the signature for the entire object 302 and calculating the identifier 307 for each data chunk 306 are combined to occur at the same time when performing in-band deduplication.

Once the signatures are calculated for the entire data object and each of the data chunks, the deduplication of the individual data chunks is performed. The process generally entails analyzing the unique signature or hash value for each data chunk. For example, during an in-band deduplication process of each corresponding data chunk, the data chunk is stored on primary storage media if the chunk has not been previously encountered; or if the chunk has been previously encountered, a pointer is created to the previous instance of the data chunk on the primary storage media in lieu of re-storing an identical data chunk. For an out-of-band deduplication process, processing is similar, but because all data is already stored, the determination made is whether to delete previously stored data.

Step 308 depicts the method and system for determining if a chunk with a matching chunk identifier is already stored in the primary storage media. If a chunk with the identical hash value already exists on the primary storage media, then the data chunk is removed when performing out-of-band deduplication as in step 309. No action is performed in step 309 for in-band deduplication, because the data chunk has not been stored on the storage media. For both in-band and out-of-band deduplication processes, a pointer is created to the already-existing data chunk on the primary storage media as in step 310.

However, if a chunk with an identical hash value does not exist on the primary storage media, then the data chunk is stored on the primary storage media when performing an in-band deduplication process as in step 311. If performing an out-of-band deduplication process, then no action is performed in step 311. As previously stated, when performing an out-of-band deduplication process, the data chunks will already be stored in the storage pool as part of data ingestion in step 301.

Figure 6:
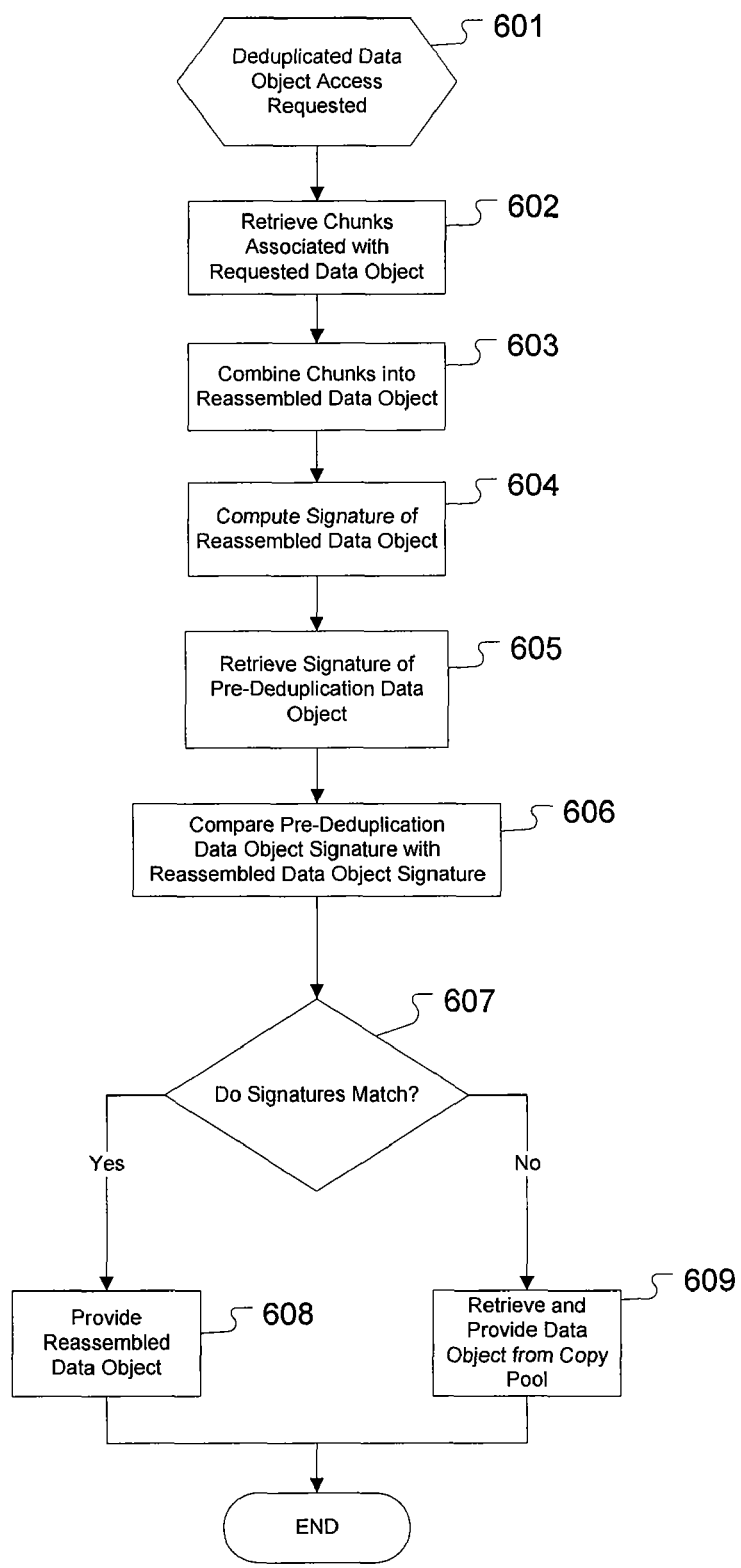
FIG. 6 illustrates a flowchart representative of an exemplary operation of the reassembly process of a deduplicated data object in accordance with one embodiment of the present invention.

After the data is fully deduplicated and stored, an operation is performed in which the deduplicated data object is accessed. The operation may be a restore, retrieve, or recall operation, or an audit which checks the integrity of stored data. The process of accessing and determining the integrity of a deduplicated data object through the use of an exemplary operation of the present invention is depicted in FIG. 6. First, as the data object is accessed in the deduplicated storage pool or other deduplicated media as in step 601, the data chunks corresponding to the requested data object are retrieved from the system and combined into a reassembled data object, steps 602 and 603, based on the tracking and mapping data stored in the index.

An integrity check of the data is then performed by computing a checksum for the reassembled object as in step 604, using the same signature generation method as was originally used for the entire object. The new signature is computed using the referenced chunks from which the object is assembled. Thus, when a deduplicated data object is subsequently accessed on the computer system, a new signature is computed for the deduplicated object based on a data object produced from a combination of the chunks needed to reassemble that object.

The signature previously generated for the data object before deduplication is retrieved, step 605, and compared with the signature generated for the reassembled data object, step 606. If the signatures match via a comparison as in step 607, the deduplicated object is considered to be valid because the reassembled data object matches its pre-deduplicated state. Accordingly, the reassembled data object is provided, step 608.

If the signatures do not match, step 607, there is something wrong with the deduplicated data object. The inaccuracy may be caused by a number of factors, such as a false match, media failure or error, or deduplication logic error. In response, step 609, the system will treat the deduplicated object as damaged, and will automatically access the corresponding non-deduplicated representation of that data object that was created at step 304 prior to deduplication. This copy of the data object may be introduced from secondary media, such as a tape or a lower-performance hard disk.

In one embodiment of the present invention, a portion of the reassembled object may be sent to the user before the data is detected as being invalid. In an alternate embodiment, the validity check may be performed before sending data. Therefore, an indication of failure may be given before any data is sent or after data is sent. In one embodiment of the present invention, if data has already been sent to the user, the client is notified to discard the previously sent data and prepare to receive the correct data.

Recovery of the damaged data object from the backup media, step 609, may produce a delay from having to mount a tape or transport media from an offsite location, but the error will be detected and data loss averted. Additionally, the invalid data object may be marked as damaged in the storage management system database or other index. The invalid data object may also be recovered to the deduplicated disk media from the backup copy. At a later time, the deduplicated object can be restored from the backup copy as determined by a damage indicator, so a valid object can be replaced on the primary storage disk. In a storage management software solution, this may occur using a storage pool restore operation.

Figure 7A:
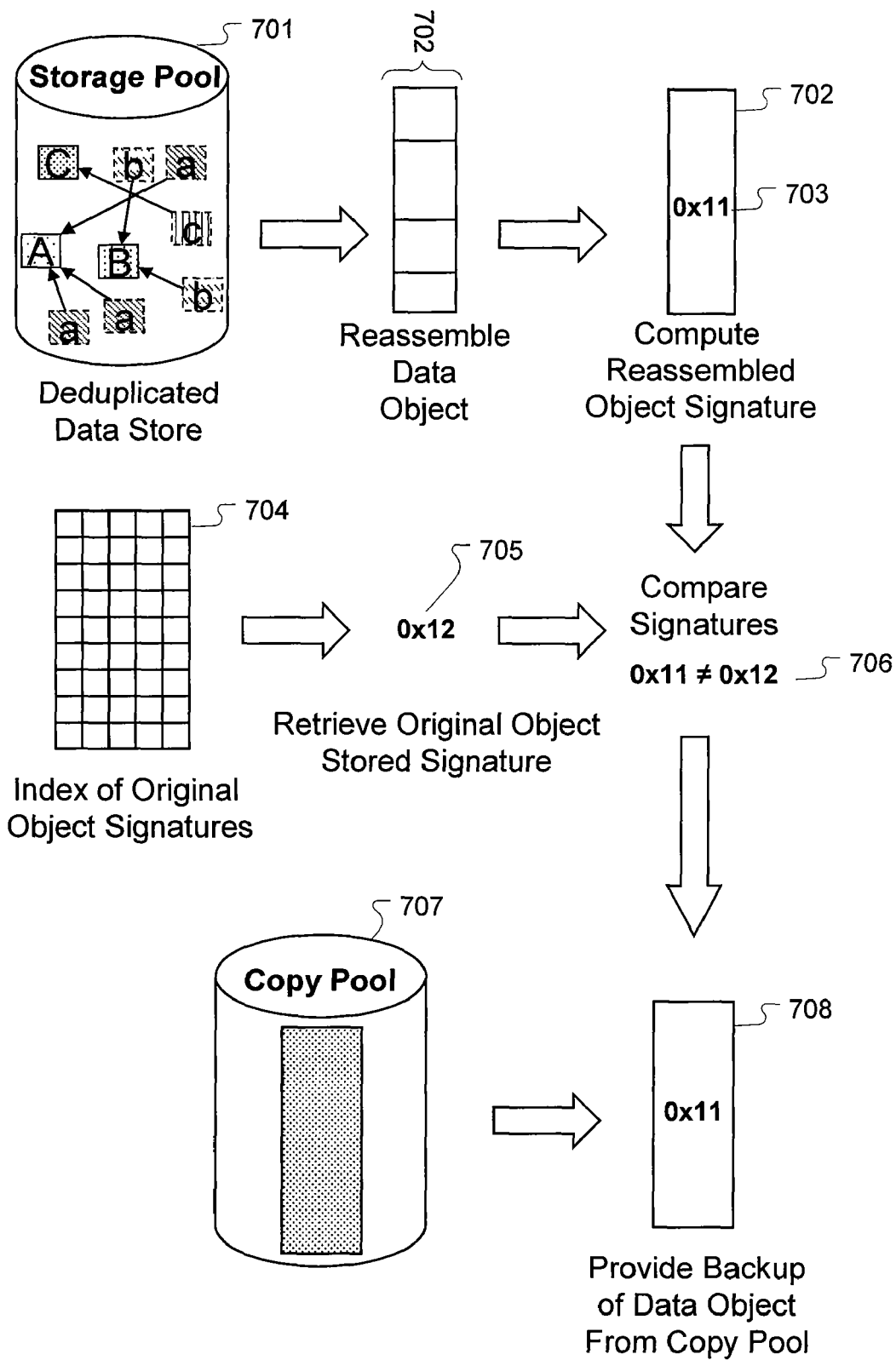
FIG. 7A illustrates a block diagram of an exemplary operation of a digital signature check on an exemplary damaged data object in accordance with one embodiment of the present invention.

FIG. 7A further depicts a flowchart diagram of an exemplary process that is performed upon identifying a deduplicated data object that has been damaged in accordance with one embodiment of the present invention. Data stored in various chunks in a deduplicated data store 701 is reassembled into a data object 702. Accordingly, the signature 703 of the reassembled object is calculated. The pre-deduplication original data object signature 705 is retrieved from an index 704 of original object signatures that were stored before deduplication. The signature of the reassembled object 703 and that of the original object 705 are then compared 706. FIG. 7A demonstrates the case where the checksums do not match, which indicates that the reassembled data object is somehow flawed and the data integrity check has failed. A copy of the data object 708 will be retrieved from secondary media 707.

Figure 7B:
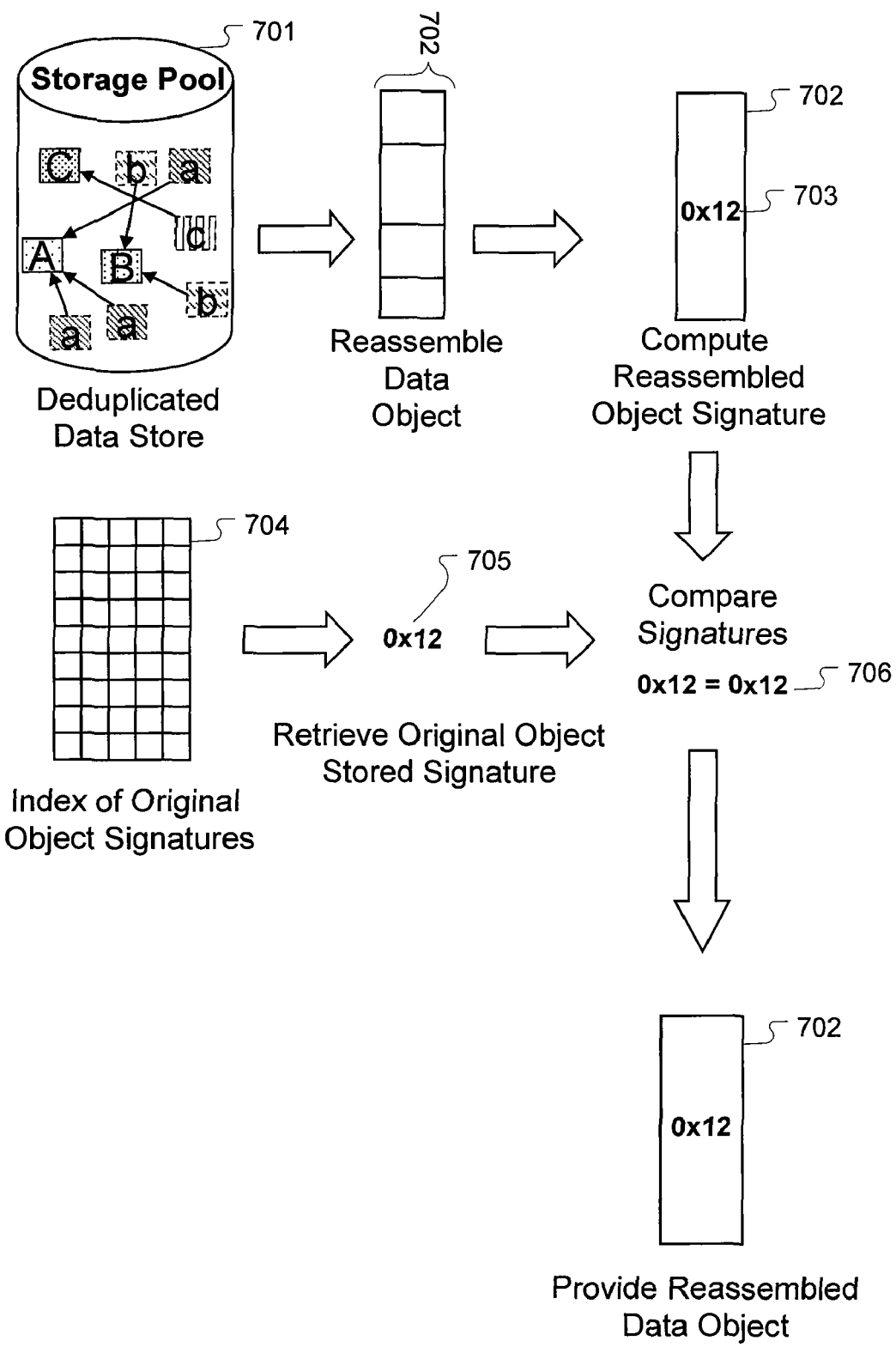
FIG. 7B illustrates a block diagram of an exemplary operation of a digital signature check on an exemplary undamaged data object in accordance with one embodiment of the present invention.

FIG. 7B further depicts a diagram evidencing the processing of a data object which was correctly reassembled into its pre-deduplicated state. Similar to the depiction in FIG. 7A, the chunks in the data store 701 are reassembled into a data object 702, and the digital signature 703 of the reassembled object 702 is computed. The digital signature of the original object 705 is retrieved from an index 704, and a comparison is performed 706. Because the object signatures match, the reassembled object is determined to be valid. Thus, the reassembled data object 702 can be provided to the user, with no need to retrieve the data object from a copy pool.

During normal operation of a system implementing the present invention, data may be accessed from deduplicated disk media, allowing fast access to such data. Only in the exceptional instances where the deduplicated data object is invalid will the data be accessed from a secondary copy with degraded performance. In addition to providing protection against deduplication errors, the secondary copy may also be used for availability, protection against media errors, and even disaster recovery.

Additionally, the present invention may be implemented in a storage-management system, but it is also applicable to a storage appliance such as a virtual tape library.

The present invention can take the form of an entirely hardware embodiment, an entirely software embodiment or an embodiment containing both hardware and software elements. In one embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Although various representative embodiments of this invention have been described above with a certain degree of particularity, those skilled in the art could make numerous alterations to the disclosed embodiments without departing from the spirit or scope of the inventive subject matter set forth in the specification and claims.

What is claimed is:

1. A method in a computer system for assuring integrity of deduplicated data, comprising:
    copying a data object within a data system to a backup storage media;
    generating an original object signature of the data object;
    storing the original object signature of the data object in an index;
    performing deduplication upon the data object, including dividing the data object into a set of one or more data chunks, and for each data chunk:
        determining if a previously stored identical copy of the data chunk exists on a primary storage media;
        storing the data chunk on the primary storage media in response to determining that a previously stored identical copy of the data chunk does not exist on the primary storage media; and
        creating a pointer to the previously stored identical copy of the data chunk on the primary storage media in response to determining that a previously stored identical copy of data chunk exists on the primary storage media;
    assembling the deduplicated data object into a reassembled state responsive to said data object being accessed by the computer system, wherein during a restore or a storage audit operation, the set of one more data chunks produced from the deduplicated data object are re-combined into a single data object;
    generating a reassembled object signature for the reassembled data object;
    comparing the reassembled object signature with the original object signature associated with the data object stored in the index;
    providing the reassembled data object if the reassembled object signature matches the original object signature; and
    providing the data object stored on the backup storage media if the reassembled object signature of the reassembled data object does not match the original object signature.

2. The method as in claim 1, wherein the original object signature and reassembled object signature are checksums using a hash function selected from the group consisting of cyclic redundancy check, MD5, SHA-1, SHA-256, SHA-512, and Whirlpool.

3. The method as in claim 1, wherein the step of determining if a previously stored data chunk is identical to the data chunk includes calculating a hash function value for the data chunk, and comparing said hash function value to an index of data chunk hash function values.

4. The method as in claim 1, wherein the data object is divided into data chunks using a Rabin fingerprinting technique.

5. The method as in claim 1, wherein the backup storage media is tape.

6. The method as in claim 1, wherein copying the data object to a backup storage media occurs synchronously during ingestion of the data object into the data system.

7. The method as in claim 1, wherein the generation of the original object signature is performed during ingestion of the data object into the data system.

8. The method as in claim 1, wherein copying the data object to a backup storage media occurs asynchronously during an operation subsequent to ingestion of the data object into the data system.

9. The method as in claim 1, wherein generation of the original object signature is performed subsequent to ingestion of the data object into the data system.

10. The method as in claim 1, wherein the data object is marked as damaged within the data system if the reassembled object signature of the reassembled data object does not match the original object signature stored in the index.

11. The method as in claim 1, wherein the data object is retrieved from the backup storage media and stored on the primary storage media if the reassembled object signature of the reassembled data object does not match the original object signature.

12. A computer program product comprising a computer useable medium having a computer readable program for assuring integrity of deduplicated data, wherein the computer readable program when executed on a computer causes the computer to:
copy a data object within a data system to a backup storage media;
generate an original object signature of the data object;
store the original object signature of the data object in an index;
perform deduplication upon the data object, including dividing the data object into a set of one or more data chunks, and for each data chunk:
determining if a previously stored identical copy of the data chunk exists on a primary storage media;
storing the data chunk on the primary storage media in response to determining that a previously stored identical copy of the data chunk does not exist on the primary storage media; and
creating a pointer to the previously stored identical copy of the data chunk on the primary storage media in response to determining that a previously stored identical copy of data chunk exists on the primary storage media;
assemble the deduplicated data object into a reassembled state responsive to said data object being accessed by the computer system, wherein during a restore or a storage audit operation, the set of one more data chunks produced from the deduplicated data object are re-combined into a single data object;
generate a reassembled object signature for the reassembled data object;
compare the reassembled object signature with the original object signature associated with the data object stored in the index;
provide the reassembled data object if the reassembled object signature matches the original object signature; and
provide the data object stored on the backup storage media if the reassembled object signature of the reassembled data object does not match the original object signature.

13. The computer program product as in claim 12, wherein copying the data object to a backup storage media occurs synchronously during ingestion of the data object into the data system.

14. The computer program product as in claim 12, wherein the generation of the original object signature is performed during ingestion of the data object into the data system.

15. The computer program product as in claim 12, wherein copying the data object to a backup storage media occurs asynchronously during an operation subsequent to ingestion of the data object into the data system.

16. The computer program product as in claim 12, wherein generation of the original object signature is performed subsequent to ingestion of the data object into the data system.

17. A system, comprising:
at least one processor; and
at least one memory storing instructions operable with the at least one processor for assuring integrity of deduplicated data, the instructions being executed for:
copying a data object within a data system to a backup storage media;
generating an original object signature of the data object, including dividing the data object into a set of one or more data chunks, and for each data chunk:
determining if a previously stored identical copy of the data chunk exists on a primary storage media;
storing the data chunk on the primary storage media in response to determining that a previously stored identical copy of the data chunk does not exist on the primary storage media; and
creating a pointer to the previously stored identical copy of the data chunk on the primary storage media in response to determining that a previously stored identical copy of data chunk exists on the primary storage media;
storing the original object signature of the data object in an index;
performing deduplication upon the data object;
assembling the deduplicated data object into a reassembled state responsive to said data object being accessed by the computer system, wherein during a restore or a storage audit operation, the set of one more data chunks produced from the deduplicated data object are re-combined into a single data object;
generating a reassembled object signature for the reassembled data object;
comparing the reassembled object signature with the original object signature associated with the data object stored in the index;
providing the reassembled data object if the reassembled object signature matches the original object signature; and
providing the data object stored on the backup storage media if the reassembled object signature of the reassembled data object does not match the original object signature.

18. The system as in claim 17, wherein copying the data object to a backup storage media occurs synchronously during ingestion of the data object into the data system.

19. The system as in claim 17, wherein the generation of the original object signature is performed during ingestion of the data object into the data system.

20. The system as in claim 17, wherein copying the data object to a backup storage media occurs asynchronously during an operation subsequent to ingestion of the data object into the data system.

21. The system as in claim 17, wherein generation of the original object signature is performed subsequent to ingestion of the data object into the data system.

22. A method in a computer system for assuring integrity of deduplicated data, comprising:
copying a data object within a data system to a backup storage media;
generating an original object signature of the data object;
storing the original object signature of the data object in an index;
performing deduplication upon the data object, including dividing the data object into a set of one or more data chunks, and for each data chunk:
determining if a previously stored identical copy of the data chunk exists on a primary storage media;

storing the data chunk on the primary storage media in response to determining that a previously stored identical copy of the data chunk does not exist on the primary storage media; and creating a pointer to the previously stored identical copy of the data chunk on the primary storage media in response to determining that a previously stored identical copy of the data chunk exists on the primary storage media;

assembling the deduplicated data object into a reassembled state responsive to said data object being accessed by the computer system, wherein during a restore or a storage audit operation, the set of one or more data chunks produced from the deduplicated data object are re-combined into a single data object;

generating a reassembled object signature for the reassembled data object;

comparing the reassembled object signature with the original object signature associated with the data object stored in the index; and providing the reassembled data object if the reassembled object signature matches the original object signature.

23. The method as in claimed 22, further comprising providing notification if the reassembled object signature dose not match the original object signature.

* * * * *